Figure 1:
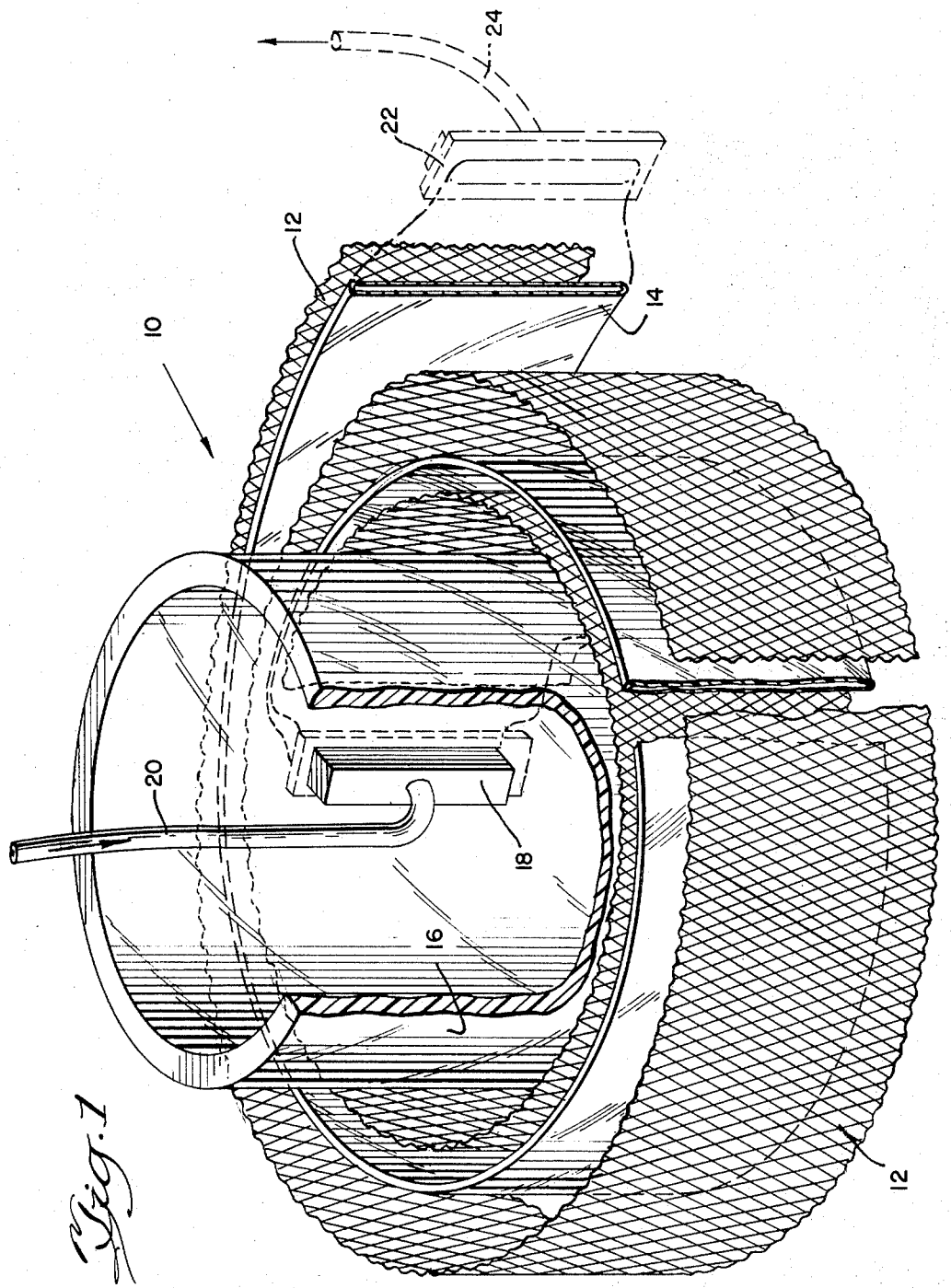

United States Patent [19]
Martinez

[11] 3,709,367
[45] Jan. 9, 1973

[54] SUPPORT STRUCTURE FOR MEMBRANE DIFFUSION DEVICES

[75] Inventor: Felix Jesus Martinez, Palatine, Ill.

[73] Assignee: Baxter Laboratories, Inc., Morton Grove, Ill.

[22] Filed: April 8, 1970

[21] Appl. No.: 26,546

[52] U.S. Cl. ...................................210/321, 210/541
[51] Int. Cl. ............................................B01d 31/00
[58] Field of Search..................210/22, 23, 321, 541; 23/258.5

[56] References Cited

UNITED STATES PATENTS 3,490,523   1/1970   Esmond..............................210/321
3,554,853   1/1971   Mercer................................161/109
3,508,662   4/1970   Miller..................................210/321
3,412,865   11/1968   Lontz et al. .........................210/321

*Primary Examiner*—Frank A. Spear, Jr.
*Attorney*—Samuel B. Smith, Jr.

[57] ABSTRACT

A support structure in the form of a foraminous screen netting having an upper plurality of strands arranged in parallel fashion and intersecting at an angle with a lower plurality of strands, also arranged in parallel fashion. Each strand provides a ridge whose apex extends in a direction generally normal to the plane of the screen upon which is supported substantially by line contact a semipermeable dialyzing membrane. Between each ridge is a groove into which extend channels defined in the membrane by the ridges.

19 Claims, 17 Drawing Figures

INVENTOR
J. Jesus Martinez
BY Samuel B. Smith, Jr.
ATTORNEY

INVENTOR
J. Jesus Martinez
BY Samuel B. Smith, Jr.
ATTORNEY

SUPPORT STRUCTURE FOR MEMBRANE DIFFUSION DEVICES

The present invention relates to improvements in a support member and particularly a foraminous support screen capable of use in an artificial kidney apparatus as well as in other devices employing a diffusion membrane. An example of another device which is known in the medical field is a blood oxygenator. For the purpose of the present discussion, however, the support screen will be discussed in association with an artificial kidney apparatus although it is understood that the invention is not to be limited to such use.

An artificial kidney apparatus, generally, is a device which is capable of removing by diffusion certain organic and inorganic substances from the blood which the body cannot otherwise eliminate because of an impairment or non-operation of certain body functions. The removal of the unwanted substance is carried out by the employment of a semipermeable dialytic membrane film which separates on one side blood from a washing or dialyzing solution on the other side. Passage of the substance from the blood to the dialyzing solution is accomplished, in either a single pass or recirculating type dialyzer by use of a solution in which the concentration is less than the concentration of that material to be diffused from the blood.

As may be expected the efficiency of the device is determined at least in part, by the surface area of the membrane exposed to both blood and dialyzing solution and over which both fluids are flowing. While dialyzers are known which employ non-supported membranes dialyzers are also known in the prior art that employ supported membranes. Generally, for the latter class of dialyzer the membrane is supported along its total length. Provision of support for the membrane is a coiled fashion, as for example in a coil dialyzer, or in a flat fashion, as for example in a film dialyzer will also, as an incident thereto, provide separation for the membrane. A supported membrane will have less exposed surface area through which diffusion may take place; but, nevertheless, the art has developed in the area of supported membrane devices and it is an object of this invention to provide a screen for supporting such a membrane in a manner such that the masking of membrane surface area is significantly less than in prior art devices. It is also an object to provide in a supported membrane device a screen which provides better support because of closer strand spacing than in the prior art and enhances other characteristics in an artificial kidney device.

One form of artificial kidney apparatus in which a foraminous screen is employed to provide membrane support and separation is discussed in the present assignee's copending U.S. Pat. application Ser. No. 720,812, filed Apr. 12, 1968, now U.S. Pat. No. 3,510,004, issued May 5, 1970, which is a continuation of U.S. Pat. application Ser. No. 582,896, filed Sept. 29, 1966, now abandoned. This type of artificial kidney apparatus, better known as the "Hoeltzenbein Kidney Coil," has been well received and used to great advantage in the medical field. It has been recognized, however, that certain physical features of the support screen employed in the Hoeltzenbein device could be improved with the end toward a more efficient operation. This application will detail these features and the inventive improvements introduced.

While a full and clear understanding of this form of artificial kidney apparatus and the manner by which it functions may be obtained through resort to the above-reference applications, one important aspect of the Hoeltzenbein invention is in connection with a foraminous screen for supporting the dialyzing membrane tubing throughout its spiral wrapped length. The support screen is in the form of a netting having both an upper and lower plural set of strands arranged in parallel fashion and defining an angle, one set to the other. When wrapped, in spiral fashion, with the tubing the upper set of parallel strands of an inner wrap of support screen and the lower set of parallel strands of the next or concentric wrap of the support screen, for example, lie against opposed sides of the dialyzing membrane tubing and impress in the tubing a multiplicity of parallel channels for the flow of blood on one side and further channels for dialyzing solution on the other membrane side. This type of interaction between support screen and tubing is illustrated to advantage in the drawings and will be discussed below.

In the artificial coil kidney apparatus of the type discussed herein, blood subject to dialysis is circulated in vitro through an extended length of dialysis membrane tubing wrapped in spiral fashion with a support screen upon a core element. Membrane tubing for this purpose is well-known in the dialysis arts. Thus, the membrane is semipermeable and formed, for example, of cellulose hydrate, cellulose acetate or Cuprophan, a cellulose base plastic sold by J. P. Bemberg A. G., a corporation of Germany. Blood flow is through the several channels impressed in the membrane by the support screen. These channels are uniquely a multiplicity of separate channels, all in fluid communication one with the other, yet with the channels impressed in the lower half of the membrane disposed at an angle with respect to the channels impressed in the upper half of the membrane.

The membrane could equally as well be laid flat as mentioned above but for the sake of illustration and definition of the invention the discussion will be directed to a coil dialyzer.

A dialyzing solution is normally flowed through the various passages defined by the support netting and over the outer membrane surface. The organic and inorganic substances from the blood are diffused through the membrane due to the presence of a concentration gradient across the membrane.

In a first aspect the present invention is significant in that it provides a screen for a dialyzing apparatus in which there is less masking of dialyzing membrane by the screen strands than is found to be the case in prior art screens. Consequently the improved screen provides for greater efficiency of the device. This factor is a result of a unique construction of the support screen, but particularly the individual strands. Thus, the individual strands forming both the upper and lower plurality of strands are formed such that they are non-circular in cross-section and present a ridge or crest to the membrane disposed thereon. Theoretically this results in a line contact. In practice, however, because of the weight of the membrane, even though just a film, and the fact that the membrane is not stretched taut upon winding with the screen on the inner core, as well as the inherent flexibility of the membrane material when subjected to fluid flow, there will be contact over a greater surface area. This is a consequence of distention of membrane into the several screen grooves. The amount of masking, however, is significantly less than the masking occurring when the membrane is supported by a circular surface.

A second important aspect of the invention is the physical spacing between the ridges of adjacent strands of both the upper and lower plurality of strands. This spacing is much reduced from that spacing known to be present in the prior art support screens. This factor is significant with regard to the question of masking of dialysis membrane as well as other important considerations, discussed below. In this connection all known support screens for supporting membranes of the type described herein are generally composed of strands having substantially a circular cross-section. Therefore, by reducing the spacing between the strands the masking of the dialyzing membrane would increase. Consequently there would be a loss of efficiency of the device. Increase in spacing distance would, on the other hand, effectively reduce the masking per unit area of dialyzing membrane. However, problems result from a too wide spacing. Therefore, in the prior art, of which the screening of the referenced applications forms a part, a compromise was reached as between support and separation capability as opposed to the masking of the dialyzing membrane by the support screen strands.

By the particular cross-section of the strands of the screen as disclosed herein the amount of making of membrane surface is reduced even though the strands are closer together. And, the improved screen, with closer strand spacing, provides greater support for the dialyzing membrane throughout its length. The improved screen also prevents excessive membrane distention, large blood volume entrapment and reduces substantially membrane deformation resulting in permanent distortion of the membrane. Also the possibility of "pillowing" or contact between the membrane of adjacent wrapped layers is reduced by the closer strand spacing. There is also less of a change in total blood volume passing through the dialyzer because of reduced membrane deformation incident to changes in perfusion pressure as perfusion flow changes.

A further important consideration is the effect the improved support screen has upon dynamic priming volume. In short, the screen holds the priming volume within narrow limits by minimizing membrane deformation as compared to other membrane supported devices. While there are many considerations regarding priming volume which are outside of the scope of this invention one consideration is to keep the priming volume, the volume that fills the dialyzer, low so that the patient is not subjected to a large volume shift into the extracorporeal system. This is accomplished by the present screen.

Generally, as blood is passed from the body into the dialyzer an equal amount of saline or other priming fluid is passed into the body from the dialyzer. The priming fluid usually diffuses rapidly from the blood stream into the body fluids. Further, water from the blood during diffusion passes through the membrane by a process known as ultrafiltration. Consequently, the circulating volume of blood of the patient is reduced. If the volume of blood taken from the patient is large as a consequence of a large priming volume the total fluid shift will be greater than had the priming volume been lower.

As a further aspect of the invention the improved supporting screen in intercooperation with the dialyzing membrane provides a "scrubbing" effect on the inner and outer surface of the membrane thereby to break up any formed stationary front at the membrane of dialyzing solution and blood.

The dynamic conditions of a flowing fluid are such that in the center of a stream the velocity of flow is greater than at the boundaries of the stream. Actually, at the membrane-fluid boundary the flow is almost in the form of a stationary front. By allowing this condition to pertain the efficiency of the dialyzer suffers since physical diffusion of compounds must occur through not only the membrane but also the substantially stationary front of blood and dialyzing solution. Therefore, with diffusion necessarily required to be carried out through a dialyzing barrier including the membrane and stationary fronts it is desirable to cause these fronts or liquid layers to circulate and mix with fresh dialyzing solution and blood entering the dialyzer.

The screen of the present invention provides improved "scrubbing" (mixing) of the membrane surfaces within the blood and dialysate channels and therefore allows greater efficiency. It is considered that this action is incident to a mixing by eddy currents or mixing vortices of the liquid at the stationary front and adjacent liquid.

According to the invention a single membrane tube, or if desired a pair of vertically spaced membrane tubes as in a twin coil, or a plurality of elongated tube lengths beginning at spaced locations about an inner core is wound about an inner core member together with the support screen, as described. An inlet connector connects one end of the tube membrane to an inflow of blood. An outlet connector connects the other end of the tube membrane to the patient providing a closed dialyzing path.

The tube membrane is in the form of a flattened cylinder which is wound substantially ribbon-like in its flattened form. The tube is wrapped about the core together with an elongated length of a foraminous support screen having on opposed sides a first and second multiplicity of raised parallel and spaced strands, the strands of the first multiplicity intersecting the strands of the second multiplicity. The support screen, therefore, serves to impress in the tube membrane a multiplicity of channels whose number is dependent upon the flattened width of the tube membrane but otherwise determined by the total number of spaced ridges and intermediate grooves in the support screen itself. Within each increment of tube membrane, therefore, the upper half will be provided with a first multiplicity of channels while the lower half will be provided with a second multiplicity of channels. Each of the channels are in fluid communication, one with the other and the channels of each multiplicity cross one another.

The support screen of the present invention is found to be a significant improvement over those screens which have existed in the dialyzing arts heretofore. The strands of the support screen are of a cross-section such that the support of the tube membrane is along a line contact. In a somewhat preferred embodiment the grooves in both the first and second multiplicity of grooves are formed between the ridges of a first multiplicity of substantially triangular ridges whose base surfaces form the support for the second multiplicity of triangular ridges. It is contemplated, however, that the ridges on each side of the sheet may be defined by the intersection of two sides of a strand of rectangle, diamond, pyramidal or polygonal shape while strands of like cross-section define the ridges on the other side of the sheet. While a triangular strand screening has been used to great advantage it is to be kept in mind that a significant aspect of the invention is not the cross-section per se but rather that membrane support is by means of and along the ridge of each strand thereby to theoretically provide line support.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciated that the conception upon which this disclosure is based may readily be utilized as a basis for the designing of other structures for carrying out the several purposes of the invention. It is important, therefore, that the claims be regarded as including such equivalent construction as do not depart from the spirit and scope of the invention.

Figure 2:
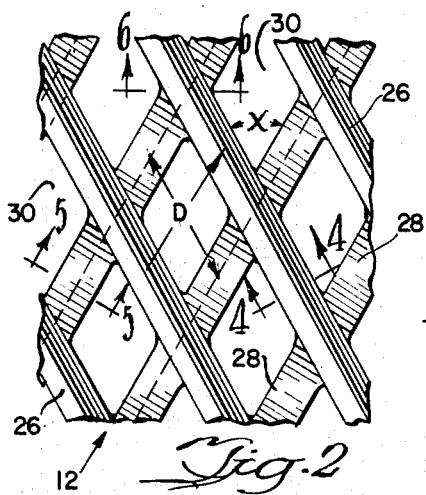
Figure 4:
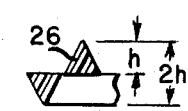
Figure 5:
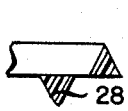
Figure 6:
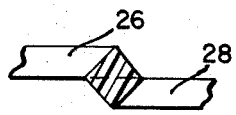
Figure 4A:
Figure 5A:
Figure 6A:
Figure 4B:
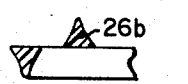
Figure 5B:
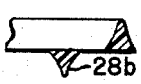
Figure 6B:
Figure 3:
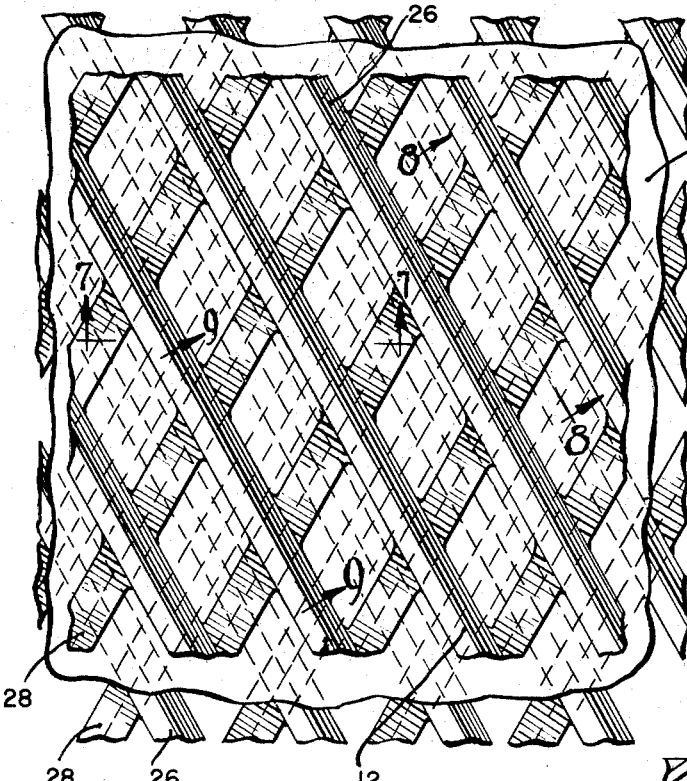
Figure 7:
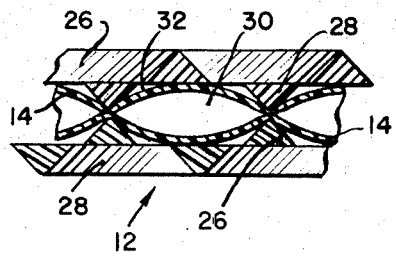
Figure 8:
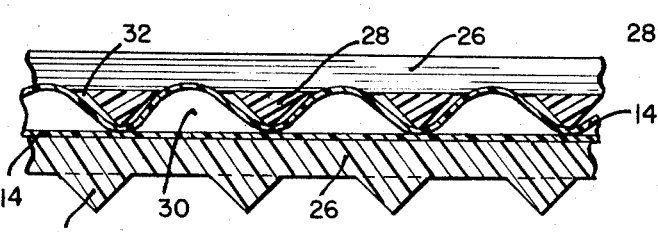
Figure 9:
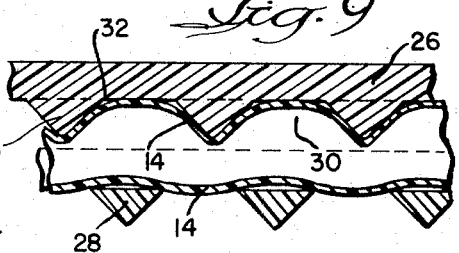
Figure 10:
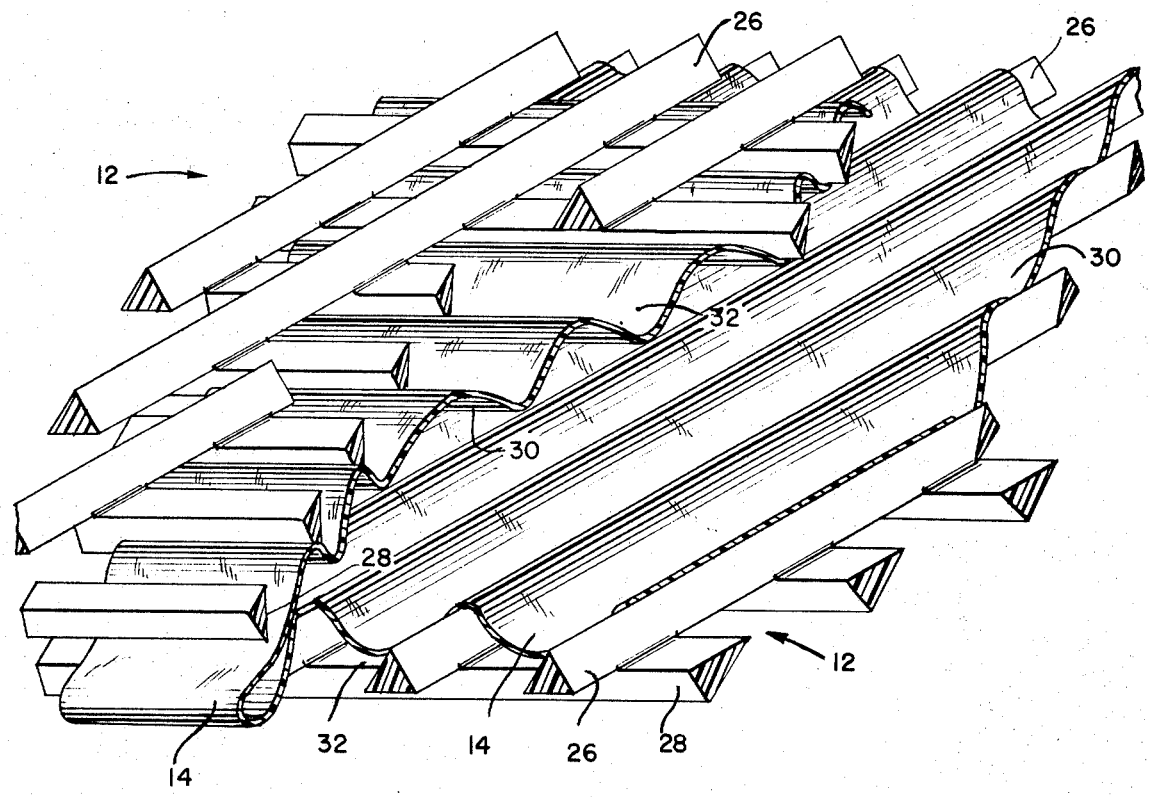
Figure 11:
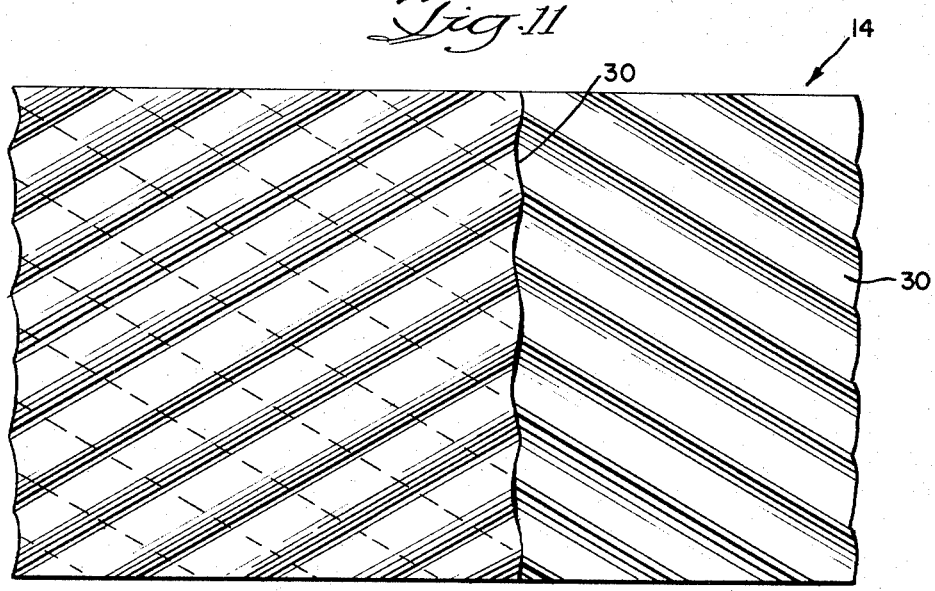

The accompanying drawings form a part of the present invention. By these drawings which illustrate a preferred form of the invention, FIG. 1 is a diagrammatic perspective view of the supporting screen and dialyzing tubing wrapped about a core member, FIG. 2 is a greatly enlarged plan view of the supporting screen, FIG. 3 is a plan view of the dialyzing tubing supported on opposed sides by the support screen with parts broken away for the purpose of illustration, FIGS. 4, 5 and 6 are sections of the screen strands as seen along the lines 4—4, 5—5 and 6—6 of FIG. 2 showing, respectively, an upper strand, a lower strand and the junction of the strands, FIGS. 4a, 5a and 6a are views similar to FIGS. 4, 5 and 6 showing a second form which the strands may exhibit, FIGS. 4b, 5b and 6b are additional views similar to FIGS. 4, 5 and 6 showing a further form which the strands may exhibit, FIG. 7 is a section as seen along the line 7—7 of FIG. 3 showing the channels formed in the dialyzing tubing by the support screen, FIG. 8 is a section as seen along the line 8—8 in FIG. 3 providing a further illustration of the channels in the dialyzing tubing, FIG. 9 is a section as seen along the line 9—9 in FIG. 3 providing an additional illustration of the channels in the dialyzing tubing, FIG. 10 is an enlarged perspective view of the channels formed in the dialyzing tubing and the support screen forming the same, and FIG. 11 is an enlarged plan view of the dialyzing tubing and channels with the upper portion of the tube broken away to illustrate the lower crossing channels.

Referring now to the drawing figures and in particular to FIG. 1, there is shown in the environment of a coil type dialyzer 10 an extended length of supporting screen 12 which, together with an extended length of a sheath-like tube membrane 14, is wrapped about an inner core 16 forming a part of a dialyzer assembly. The sheath-like tube membrane, serving as the blood flow passage of the dialyzer, may be of varying length as determined by the type of dialyzer and the area of the dialyzing chamber in relation to the thickness of the screen and the membrane itself. Generally, however, the length may be approximately 200 to 500 cm. Thus, since both sides of the membrane are supported and spaced from adjacent wraps as well as both the inner core 16 and the outer confining surface (not shown) the screen will be of greater length. In this connection the greater length will reflect the circumferential measurement of the most exterior wrap.

The core member, shown in the figure to be circular in cross-section, is preferably of this cross-section. This core may be formed of plastic, metal or any other equivalent construction as will provide a support base upon which each of the screen member and sheath-like tube membrane is wrapped.

Preferably, the core member provides within the wall surface a cut-out to removably receive a connector unit, such as the unit 18. This connector serves to provide fluid connection between the sheath-like tube membrane and a tube 20 of reduced volumetric size. By provision of a connector which somewhat conforms to the flat width dimension of the membrane the latter may be connected without undue crimping, etc. of the membrane film. A second substantially identical connector unit 22 fluidly connects the other end of the sheath-like tube membrane to a second tube 24. Blood flow input to the dialyzer is pictorially shown as entering the wrapped membrane at the core thereby consequently causing the blood flow path to terminate at the outer wrap. The showing is for the purpose of illustration, only, and is not intended to in any way limit the otherwise permissible scope of the invention for both the input and output locations could equally as well be reversed.

Structure (not shown) is received about the wrapped components. Thus, the wrapped integrity of the membrane is maintained, not only to each wrap of membrane and support but also to the inner core and outer support. Dialyzing fluid is circulated through the area in which the wrapped components are disposed thereby to flow over the outer membrane surface. This will permit diffusion of the organic and inorganic substances from the blood to take place assuming the existence of a concentration gradient, as already discussed.

The supporting screen 12 and particularly the several strand pluralities 26 and 28 may be seen to best advantage in FIGS. 2 and 4–6. In this connection the screen, in a somewhat preferred embodiment, is formed by a first plurality of strands 26 and a second plurality of strands 28 which are of like cross-section. The cross-section is, in the figures, triangular although other polygonal shapes may be employed. However, polygonal shapes having few sides are preferred thereby to define a strand cross-section which does not approximate a circle. Therefore, the strand will include a ridge for support as will be discussed.

The strands are disposed in an upper pattern and a lower pattern, respectively. Each pattern is supported by and underlies the other pattern. The strands are also disposed at an angle, denoted in FIG. 2 by the symbol $\alpha$, defining an angle of less than substantially 90°.

Each strand of the strand pluralities 26 and 28 is spaced apart, one from the other, by a distance D which is measured from approximately the outwardly extending ridge of one triangular strand to approximately the outwardly extending of an adjacent parallel strand. The distance may be within the range of approximately 0.030 inch to approximately 0.090 inch. The height $h$ of each strand is approximately 0.025 inch. Therefore, the overall thickness of the screen 12 will be approximately 0.050 inch.

A support screen which displays strands the dimensions and cross-section of which as well as spacing and angular disposition that fall within parameters as described provides a significantly improved support for a dialyzing membrane of the type used, for example, in a coil type dialyzer. The particular cross-section of the strand but more specifically the height and ridge of each strand presented to the membrane and the strand spacing as well as strand height effects the area of membrane masking and the various considerations relative to membrane distention within the grooves 30 formed between the strand pluralities 26 and 28.

FIGS. 4a–b, 5a–b and 6a–b represent further forms of strand configuration. In this connection strands 26a and 28a are shown to be generally triangular having, however, the upstanding side slightly undercut. In each form the strands fall within the parameters above and each strand presents in an outward direction (the direction toward the sheath-like membrane) a ridge to provide line contact.

While good result have been achieved by the use of a support screen the strands of which fall within the range of the above parameters it has been found that significant results are derived from a screen of triangular cross-sectional strands having an height of approximately 0.025 inch, an included angle at the ridge of from approximately 30° to approximately 60°; a strand spacing or opening between parallel strands of approximately 0.075 inch; and, wherein the strand of the several pluralities cross one another at an angle of approximately 60°. Therefore, this screen construction is preferred.

The screen support is formed of plastic, such as polypropylene, polyethylene, polystyrene, nylon, or a substantially non-deformable yet resilient elastomer or of metal. The material employed should be one that will support without deformation, one that may be fabricated and one that necessarily will not be deleteriously effected by contact of dialyzing fluids. In this context a screen of polypropylene may be employed to advantage.

FIGS. 3 and 7–11 are all illustrative of the type of support achieved for the membrane by the support screen of this present invention. The figures, further, illustrate the manner by which the strands impress in the membrane tubing a multiplicity of channels for conducting blood through the dialyzer. The strands also provide a multiplicity of channels on the other side of the membrane for passing dialyzing fluid over the surface a necessary requirement for the diffusion of substances through the membrane.

The channels are seen possibly best in FIG. 10. In the figure the membrane 14 is disposed between layers of screening 12 to generally represent the condition upon wrapping. In this condition, the strands 26 impress within a lower portion of the membrane 14 a series of channels 30 and the strands 28 impress within the upper portion of the membrane a further series of channels 30.

The several channels 30 are in fluid communication one with the other and collectively serve to circulate the blood through the dialyzer. By providing the several channels a greater volume of the circulated blood will be able to flowingly contact the membrane surface than would be the case otherwise.

In addition to forming the several blood flow channels 30 within the membrane, the support screen forms outside the membrane a plurality of channels 32 within the grooves between screen strands. The channels 32 serve to flow the dialyzing fluid in contact with the membrane thereby to permit diffusion of substances from the blood. Similarly, a greater volume of circulated dialyzing fluid will contact the membrane other surface with the result that good diffusion efficiency is obtained.

In FIG. 3 a section of membrane 14 is illustrated as being supported by sections of supporting screen 12 disposed both above and below the membrane. A typical section of membrane is also illustrated in FIG. 11 as is both the upper and lower channels 30 formed therein.

FIGS. 7–9 represent sections through the membrane 14 and supporting screen 12 thereby providing a further illustration of the several blood flow channels formed in the membrane tube. The figures further show the several dialyzing fluid channels formed outside the membrane tube.

From the foregoing, it will be seen that in accordance with the present invention there is provided an improved support screen for use in a membrane separation device thereby to provide better membrane support and less masking of membrane surface. The screen of the present invention therefore performs the object and provides advantages heretofore not achieved in similar type devices.

Having described the invention with particular reference to the preferred form thereof, it will be obvious to those skilled in the art to which the invention pertains, after understanding the invention, that various changes and modifications may be made therein without departing from the spirit and scope of the invention as defined by the claims appended hereto.

Having described the invention, what is claimed is:

1. In combination with an artificial kidney apparatus, a foraminous screen member supporting an extended length of dialyzing tubing in the form of a plastic sheath-like film, said foraminous screen member comprising a first plurality of parallel strand elements, a second plurality of parallel strand elements overlying and supported by said first strand elements and vice versa, each of said pluralities crossing one another thereby to define an angle, each strand element of said pluralities providing a ridge the apex of which is directed outwardly in a direction substantially normal to the plane of contact of said first and second pluralities of strand elements, and each said element being spaced apart from an adjacent element of the same plurality through a distance of from about 0.030 inches to about 0.090 inches, the ridge apices of said first plurality of strands cooperating to support through substantially line contact said dialyzing tubing and to impress into one side thereof a first plurality of fluid channels which depend into the spaces between and otherwise out of substantial contact with said strand elements.

2. The combination of claim 1 comprising an inner core, said dialyzing tubing and foraminous screen member being wound about said core in a manner such that the other side of said dialyzing tubing is supported by said second plurality of strands providing similarly a second plurality of fluid channels at an angle to and in fluid communication with said first plurality of channels.

3. The combination of claim 2 wherein each strand element is substantially triangular in cross-section.

4. The combination of claim 2 wherein said strand elements are continuous.

5. The combination of claim 2 wherein said foraminous screen member is made of plastic.

6. The combination of claim 2 comprising connector means for fluid connection of said sheath-like tube in an extracorporeal fluid system, one of said connector means being removably mounted by said inner core.

7. The combination of claim 2 wherein said angle is less than substantially 90°.

8. The combination of claim 7 wherein said angle is approximately 60°.

9. The combination of claim 1 wherein said spacing is approximately 0.075 inches.

10. In combination with an artificial kidney apparatus, a foraminous screen member supporting an extended length of dialyzing tubing in the form of a plastic sheath-like film, said foraminous screen member comprising a first plurality of parallel strand elements, a second plurality of parallel strand elements overlying and supported by said first strand elements and vice versa, each of said pluralities crossing one another thereby to define an angle, each strand element of said pluralities providing a ridge, the apex of which is directed outwardly in a direction substantially normal to the plane of contact of said pluralities of strand elements, and each said strand element of said pluralities being spaced from an adjacent strand element of the same plurality by a distance of from about 1.2 to about 3.6 times the height of said apex from said plane thereby forming an open space therebetween, the ridges of said first plurality of strand elements providing substantially line contact support for said dialyzing tubing and impressing into one side thereof a first plurality of fluid channels which depend into said spaces and otherwise out of substantial contact with said strand elements.

11. The combination of claim 10 comprising an inner core, said dialyzing tubing and foraminous screen member being wound about said core in a manner such that the other side of said dialyzing tubing is supported by said second plurality of strands providing similarly a second plurality of fluid channels at an angle to and in fluid communication with said first plurality of channels.

12. The combination of claim 11 wherein each strand element is substantially triangular in cross-section.

13. The combination of claim 11 wherein said strand elements are continuous.

14. The combination of claim 11 wherein said foraminous screen member is made of plastic.

15. The combination of claim 11 comprising connector means for fluid connection of said sheath-like tube in an extracorporeal fluid system, one of said connector means being removably mounted by said inner core.

16. The combination of claim 11 wherein said spacing between said strands is within the range of from approximately 0.030 inches to approximately 0.090 inches.

17. The combination of claim 16 wherein said spacing is approximately 0.075 inches.

18. The combination of claim 11 wherein said angle is less than 90°.

19. The combination of claim 18 wherein said angle is approximately 60°.

* * * * *